United States Patent [19]

Lin

[11] Patent Number: 5,151,844
[45] Date of Patent: Sep. 29, 1992

[54] HANDBRAKE OPERATED CONTROL MEANS FOR CONTROLLING VEHICLE ACCELERATOR PEDAL

[76] Inventor: Yu Lin, P. O. Box 55-1670, Taipei, Taiwan

[21] Appl. No.: 564,425

[22] Filed: Aug. 7, 1990

[51] Int. Cl.$^5$ ............................................. B60D 1/62
[52] U.S. Cl. ..................................... 361/179; 307/9.1; 307/119; 307/124; 200/61.87
[58] Field of Search .................... 200/61.87, 61.89; 361/139, 143, 144, 170, 179, 189; 307/112, 113, 116, 119, 122, 124, 9.1

[56] References Cited

U.S. PATENT DOCUMENTS

| | | | |
|---|---|---|---|
| 4,192,399 | 3/1980 | Otteson et al. | 200/61.89 |
| 4,543,569 | 9/1985 | Karlstrom | 200/61.89 |
| 5,031,737 | 7/1991 | Dzioba et al. | 200/61.89 |

*Primary Examiner*—Jeffrey A. Gaffin

[57] ABSTRACT

A hand brake operated control device of a car includes an electrical control circuit having a normal-open switch positioned under a rear cam portion of a hand brake lever, a normal-close switch formed in a front portion of the hand brake lever to be operatively depressed by a push button of the hand brake lever, and an electromagnetic switch which is powered for protruding a core latch outwardly to retard a depression of an accelerator pedal of the car, whereby upon an upwardly pulling of the hand brake lever for braking the car, the normal-open switch will be closed by the rear cam portion of the hand brake lever to close the electrical control circuit to actuate the electromagnetic switch to protrude the core latch outwardly for retarding a depression of the accelerator pedal for preventing the driving of a hand braked car for protecting the car; and upon a depression of the push button of the hand brake lever, the normal-close switch will be opened as being depressed by the push button to thereby open the control circuit so as to retract the core latch of the electromagnetic switch for a free depression of the accelerator pedal for normally driving the car.

1 Claim, 2 Drawing Sheets

HANDBRAKE OPERATED CONTROL MEANS FOR CONTROLLING VEHICLE ACCELERATOR PEDAL

BACKGROUND OF THE INVENTION

When a car driver forgets to lock a hand brake which was previously pulled upwardly for temporary parking, and drives his car with the braked car as locked by the hand brake, the car brake system may be easily damaged and possibly causing a sudden ceasing of the engine causing an immediate stop of a running car. This situation could cause a traffic accident or an injury due to a rear end collision.

It is therefore expected to invent a control means of hand brake to retard the treading of an accelerator pedal of a hand braked car, unless the car braked by the hand brake has been unlocked.

SUMMARY OF THE INVENTION

The object of the present invention is to provide a control means including at least a control switch formed in the hand brake, and an electromagnetic switch formed behind the accelerator pedal, whereby upon a pulling of the hand brake to brake the car, the control switch in the hand brake will be actuated to electromagnetically attract a core latch of the electromagnetic switch outwardly to retard the depression of the accelerator pedal by the driver to protect the car and prevent driving of a braked car.

BRIEF DESCRIPTION OF THE DRAWINGS

FIG. 1a shows another location of a control switch of the present invention.

DETAILED DESCRIPTION

Figure 1:
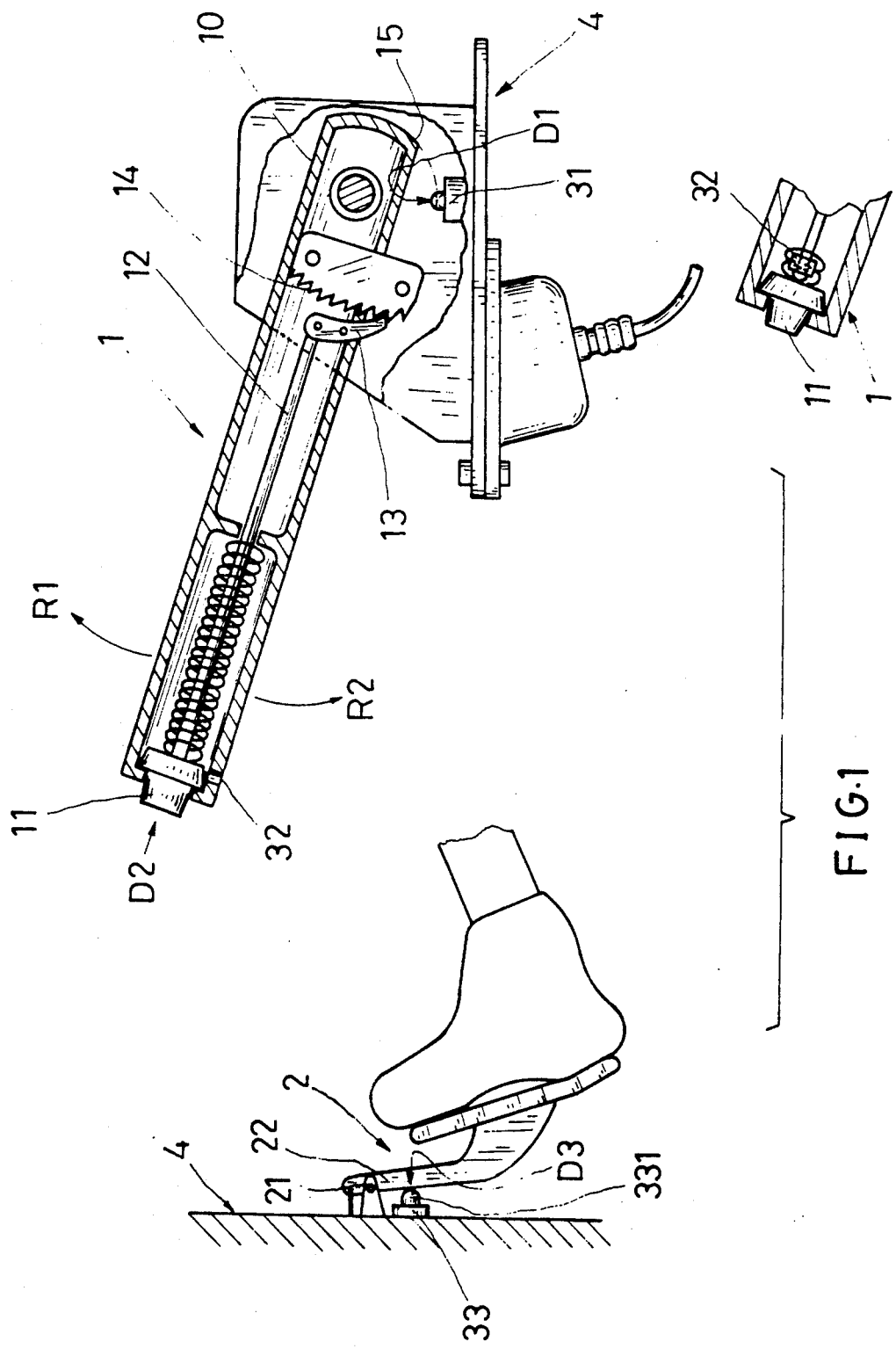
FIG. 1 is an illustration of the present invention provided in a car.
Figure 2:
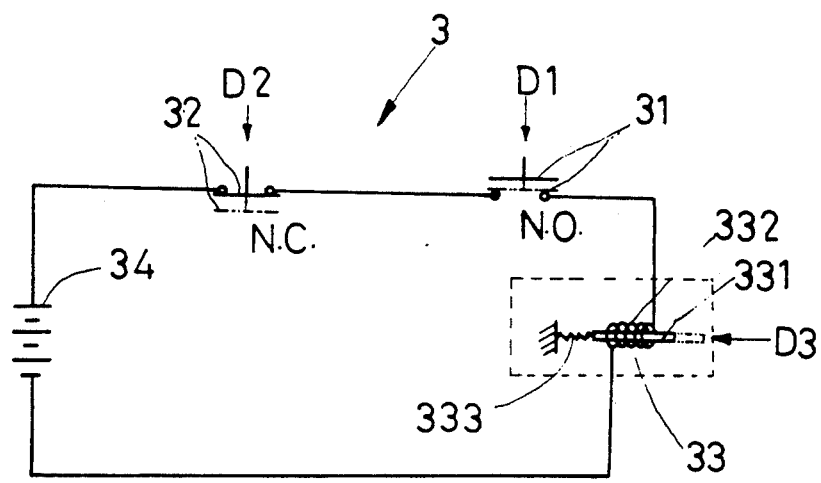
FIG. 2 is a circuit diagram of the electrical control circuit of the present invention.

As shown in FIGS. 1 and 2, the present invention comprises: an electrical control circuit 3 respectively mounted in a hand brake 1 and in a car body 4 adjacent to the accelerator pedal 2.

The electrical control circuit 3 as shown in FIG. 2 includes a normal-open switch 31 positioned under a rear cam portion 15 of the hand brake 1, a normal-close switch 32 formed in a push button 11 of the hand brake 1, an electromagnetic switch 33 adjacent to the accelerator pedal 2, and a power source 34 including batteries which may be a car battery originally provided in a car. The switch 32 is formed in a front portion inside the hand brake 1 to be operatively depressed by the push button 11. The switch 33 includes a core latch 331 surrounded by an electromagnetic coil 332 electrically connected to two poles of the power source 34, and a restoring spring 333 normally pulling the latch 331 inwardly from the switch 33 to retract the latch 331, allowing a normal treading of the accelertor pedal 2 when driving the car. The switch 33 is provided behind or under a pivotal end portion 22 approximate a pivot 21 which is provided for pivotally mounting the pedal 2 on a front portion of the car body 4.

The hand brake may be formed in a middle portion of the car body 4 as same as a conventional car hand brake, and the switch 32 may be installed in the front end portion of the hand brake 1 to be depressed by the push button 11.

When the hand brake 1 provided with the present invention is pulled upwardly in direction R1 as shown in FIG. 1, the rear cam portion 15 formed on a rear portion of the hand brake lever 10 will be biased downwardly to depress the normal-open switch 31 of the control circuit 3 to close the circuit 3 (D1) to power the electromagnetic switch 33 to protrude the latch 331 outwardly to retard the depression of accelerator pedal 2 as shown in FIGS. 1 and 2 to ensure driving safety, unless the braked hand brake 1 has been released. Since the switch 32 is normally closed, the upwardly pulling of hand brake 1 to close the switch 31 will finish a complete closed circuit 3 for actuating the electromagnetic switch 33 as aforementioned.

When downwardly returning the hand brake 1 to its original flat position, the push button 11 must be first depressed(D2) to disengage a pawl 13 formed on a rear end of a pawl rod 12 secured with the button 11 from the ratchet 14 so that the lever 10 can be rotated in direction R2 and recovered to its downward position. The depression of push button 11 will also depress the normal-close switch 32 to open contactors of the switch 32 to thereby open the circuit 3, from that the electromagnetic switch 33 is not powered and the restoring spring 333 will retract the latch 331 inwardly without retarding the depression of pedal 2. So, the hand brake 1 is operated as usual to release a braked car especially when temporarily parking on s sloping road or ground, the accelerator pedal 2 may then be depressed for "climbing" a sloping surface.

By installing the control circuit 3 of the present invention in a car, the accelerator pedal can be trodden to start the car running only after unlocking the hand brake. Otherwise, the latch 331 of the electromagnetic switch 33 will be extended outwardly to retard the depression of pedal 2 so as to ensure car and traffic safety.

The switch 33 may be substituted with other extending mechanism such as by a motor-driven rack (not shown) having a rack driven by a gear coupled to a motor which is powered by closing the switch 31 to extend a latch formed on an outer end of the rack for retarding the depression of the accelerator pedal 2. When the motor is not powered, the depression of pedal 2 may retract the rack to counter-rotate the gear freely. Other mechanisms or devices may also be used in this invention without departing from the spirit and scope of this invention.

What is claimed is:

1. A hand brake operated control means of a vehicle comprising:

an electrical control circuit including a normal-open switch positioned under a rear cam portion of a hand brake lever to be operatively depressed by said rear cam portion of said hand brake lever when upwardly pulling said hand brake lever for braking a vehicle;

a normal-close switch formed in a front portion of said hand brake lever to be operatively depressed by a push button of said hand brake lever; and an electromagnetic switch positioned behind or under a pivotal end portion of an accelerator pedal pivotally mounted in the vehicle, and having a core latch surrounded by an electromagnetic coil electrically connected to two poles of a power source of said electrical control circuit and a restoring spring normally pulling said core latch inwardly, allowing a normal depression on said accelerator pedal, whereby upon an upwardly pulling of said hand brake lever for braking the vehicle, said normal-open switch will be closed by the rear cam portion of the hand brake lever to close said control circuit to actuate said electromagnetic switch to protrude said core latch outwardly for retarding a depression of said accelerator pedal for preventing the driving of a hand braked vehicle for protecting the vehicle and preventing driving accident; and upon a depression of the push button of said hand brake lever, said normal-close switch will be opened as being depressed by said push button to thereby open said control circuit so as to retract said core latch of said electromagnetic switch for a free depression of said accelerator pedal for normally driving said vehicle.

* * * * *